United States Patent
Ash et al.

(10) Patent No.: US 10,095,628 B2
(45) Date of Patent: Oct. 9, 2018

(54) CONSIDERING A DENSITY OF TRACKS TO DESTAGE IN GROUPS OF TRACKS TO SELECT GROUPS OF TRACKS TO DESTAGE

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/868,865

(22) Filed: Sep. 29, 2015

(65) Prior Publication Data
US 2017/0091109 A1    Mar. 30, 2017

(51) Int. Cl.
*G06F 12/08* (2016.01)
*G06F 12/0891* (2016.01)

(52) U.S. Cl.
CPC ...... *G06F 12/0891* (2013.01); *G06F 2212/22* (2013.01); *G06F 2212/224* (2013.01)

(58) Field of Classification Search
CPC ............ G06F 12/0804; G06F 12/0866; G06F 12/0891; G06F 12/128; G06F 12/0897; G06F 3/061; G06F 12/0871; G06F 2212/222; G06F 3/0611; G06F 12/0868; G06F 12/0875; G06F 12/121; G06F 2212/608; G06F 3/06; G06F 2201/885; G06F 11/073; G06F 11/0754; G06F 11/076; G06F 12/0811; G06F 2212/283; G06F 3/0604; G06F 11/1068; G06F 12/0246; G06F 12/084; G06F 12/0893;
(Continued)

(56) References Cited

U.S. PATENT DOCUMENTS 6,418,515 B1   7/2002  Kurosawa
7,752,173 B1   7/2010  Gole
(Continued)

FOREIGN PATENT DOCUMENTS

CN   103106153   5/2013

OTHER PUBLICATIONS

J. Hu, et al., "PUD-LRU: An Erase-Efficient Write Buffer Management Algorithm for Flash Memory SSD", IEEE, Mascots, 2010, pp. 10.
(Continued)

*Primary Examiner* — Tuan Thai
*Assistant Examiner* — Edward Waddy, Jr.
(74) *Attorney, Agent, or Firm* — David W. Victor; Konrad Raynes Davda & Victor LLP

(57) ABSTRACT

Provided are a computer program product, system, and method for considering a density of tracks to destage in groups of tracks to select groups of tracks to destage. Groups of tracks in the cache are scanned to determine whether they are ready to destage. A determination is made as to whether the tracks in one of the groups are ready to destage in response to scanning the tracks in the group. A density for the group is increased in response to determining that the group is not ready to destage. The group is destaged in response to determining that the density of the group exceeds a density threshold.

20 Claims, 10 Drawing Sheets

(58) Field of Classification Search
CPC .......... G06F 2212/202; G06F 12/0848; G06F 12/1054; G06F 12/127; G06F 17/30132; G06F 2212/1016; G06F 2212/1041; G06F 2212/214; G06F 2212/7205; G06F 3/065; G06F 3/0688; G06F 11/3485; G06F 12/0238; G06F 12/0806; G06F 12/0808; G06F 12/0815; G06F 12/0877; G06F 12/12; G06F 2212/502; G06F 2212/604; G06F 3/0614; G06F 3/0647; G06F 3/0649; G06F 11/34; G06F 11/3452; G06F 2201/81; G06F 2212/22; G06F 2212/462; G06F 2212/282; G06F 2212/281; H04L 1/0002; H04L 43/16; H04L 47/29
USPC ........ 711/118, 135, 133, 103, E12.022, 134, 711/130, 143, 144, E12.04, E12.043, 711/E12.077, 141, 142, 159, E12.001, 711/E12.038, E12.069, 113, 121, 122, 711/123, E12.002, E12.007, E12.008, 711/E12.009, E12.07, E12.103, 100, 165; 710/104, 15, 8; 369/30.23, 30.24
See application file for complete search history.

(56) References Cited

U.S. PATENT DOCUMENTS

| | | | |
|---|---|---|---|
| 8,402,226 B1 | 3/2013 | Faibish et al. | |
| 8,533,393 B1* | 9/2013 | Cote | G06F 12/0804 711/118 |
| 8,549,220 B2 | 10/2013 | Beardsley et al. | |
| 8,549,225 B2 | 10/2013 | Blinick et al. | |
| 8,825,944 B2 | 9/2014 | Benhase et al. | |
| 8,832,377 B2 | 9/2014 | Benhase et al. | |
| 8,930,619 B2 | 1/2015 | Barrell et al. | |
| 8,935,462 B2 | 1/2015 | Benhase et al. | |
| 9,081,663 B2 | 7/2015 | Melik-Martirosian | |
| 2005/0177687 A1 | 8/2005 | Rao | |
| 2005/0216719 A1 | 9/2005 | Ma | |
| 2008/0005464 A1 | 1/2008 | Lubbers et al. | |
| 2008/0082769 A1* | 4/2008 | Bouchou | G06F 3/061 711/161 |
| 2010/0211737 A1* | 8/2010 | Flynn | G06F 3/0616 711/114 |
| 2010/0274962 A1 | 10/2010 | Mosek et al. | |
| 2011/0296122 A1* | 12/2011 | Wu | G06F 12/0804 711/156 |
| 2012/0124294 A1* | 5/2012 | Atkisson | G06F 11/108 711/135 |
| 2014/0089558 A1 | 3/2014 | Baderdinni | |
| 2014/0181412 A1* | 6/2014 | Thottethodi | G06F 12/0871 711/133 |
| 2014/0189252 A1* | 7/2014 | Biswas | G06F 12/0884 711/142 |
| 2014/0208020 A1 | 7/2014 | Benhase et al. | |
| 2014/0304475 A1 | 10/2014 | Ramanujan et al. | |
| 2015/0067264 A1 | 3/2015 | Eckert et al. | |
| 2015/0186048 A1 | 7/2015 | Kobashi et al. | |
| 2016/0085674 A1 | 3/2016 | Sterns et al. | |

OTHER PUBLICATIONS

J. Schindler, et al., "Improving Throughput for Small Disk Requests with Proximal I/O", NetApp, Inc., 2011, pp. 15.

Q. Wei, et al., "CBM: A Cooperative Buffer Management for SSD", IEEE, 2014, pp. 12.

J. Boukhobza, et al., "A Scalable and Highly Configurable Cache-Aware Hybrid Flash Translation Layer", Computers Mar. 2014, pp. 23.

U.S. Appl. No. 14/868,906, filed Sep. 29, 2015.

U.S. Appl. No. 14/868,917, filed Sep. 29, 2015.

List of Patents or Patent Applications Treated As Related.

English translation of CN103106153 filed May 15, 2013.

Notice of Allowance dated Jun. 5, 2017, pp. 13, for U.S. Appl. No. 14/868,917, filed Sep. 29, 2015.

Office Action dated Jun. 28, 2017, pp. 117, for U.S. Appl. No. 14/868,906, filed Sep. 29, 2015.

Office Action dated Feb. 10, 2017, pp. 47, for U.S. Appl. No. 14/868,917, filed Sep. 29, 2015.

Response dated May 10, 2017, pp. 14, to Office Action dated Feb. 10, 2017, pp. 47, for U.S. Appl. No. 14/868,917, filed Sep. 29, 2015.

Response dated Sep. 28, 2017, pp. 13, to Office Action dated Jun. 28, 2017, pp. 117, for U.S. Appl. No. 14/868,906, filed Sep. 29, 2015.

Notice of Allowance dated Sep. 27, 2017, pp. 14, for U.S. Appl. No. 14/868,917, filed Sep. 29, 2015.

Final Office Action dated Dec. 8, 2017, pp. 74, for U.S. Appl. No. 14/868,906, filed Sep. 29, 2015.

U.S. Appl. No. 15/820,462, filed Nov. 21, 2017.

List of IBM Patents or Patent Applications Treated as Related filed Jan. 12, 2018, pp. 2.

Notice of Allowance dated Jan. 3, 2018, pp. 14, for U.S. Appl. No. 14/868,917, filed Sep. 29, 2015.

Response dated Mar. 8, 2018, pp. 12, to Final Office Action dated Dec. 8, 2017, pp. 74, for U.S. Appl. No. 14/868,906, filed Sep.29, 2015.

Office Action dated Apr. 4, 2018, pp. 76, for U.S. Appl. No. 14/868,906, filed Sep. 29, 2015.

Response to Office Action 3 for U.S. Appl. No. 14/868,906, dated Jul. 5, 2018, 11 pp.

Notice of Allowance 4 for U.S. Appl. No. 14/868,917, dated Jun. 5, 2018, 13 pp.

Office Action 1 for U.S. Appl. No. 15/820,462, dated Apr. 30, 2018, 71 pp.

\* cited by examiner

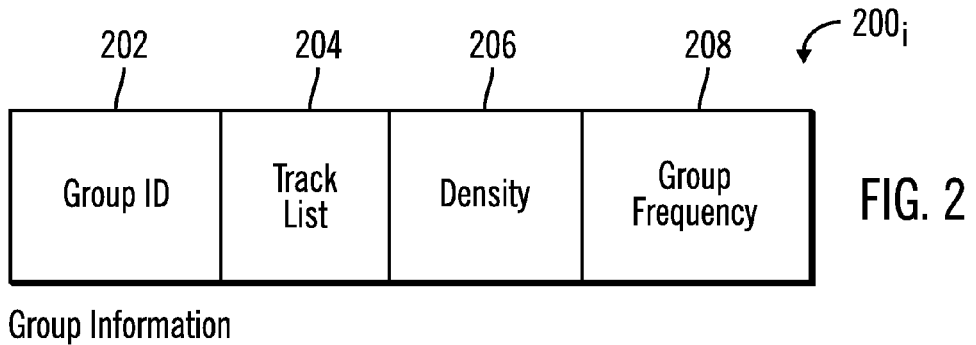
Group Information
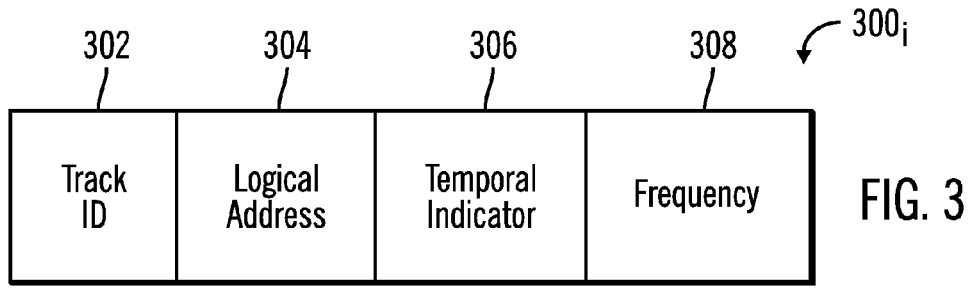
Track Information
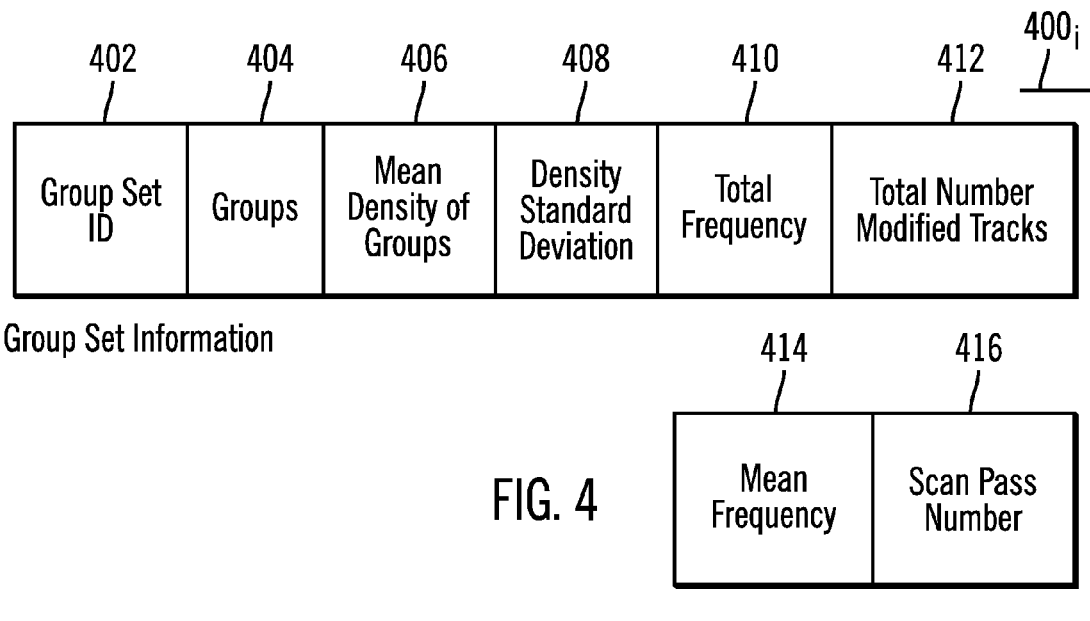
Group Set Information
FIG. 4

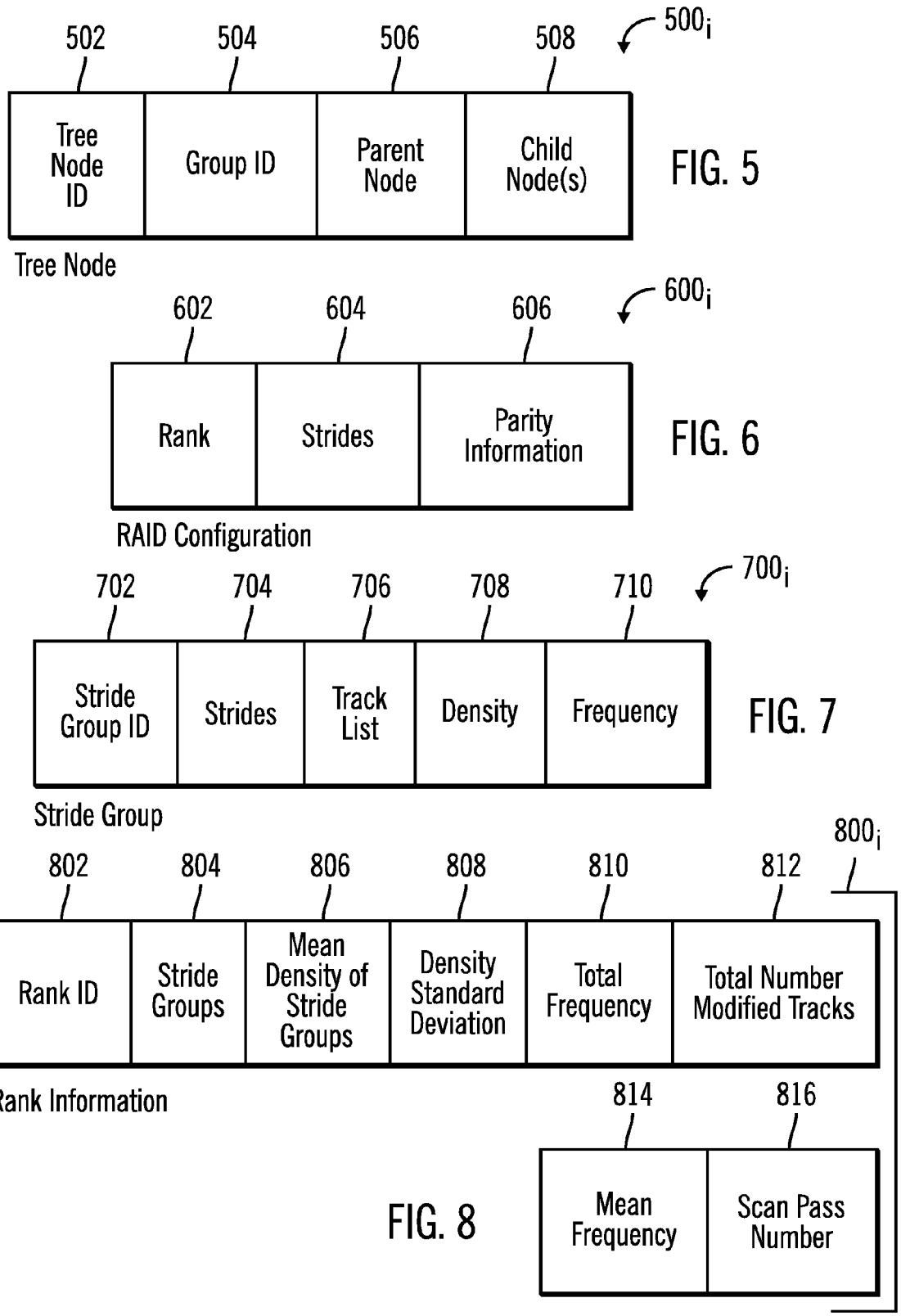

CONSIDERING A DENSITY OF TRACKS TO DESTAGE IN GROUPS OF TRACKS TO SELECT GROUPS OF TRACKS TO DESTAGE

BACKGROUND OF THE INVENTION

1. Field of the Invention

The present invention relates to a computer program product, system, and method for considering a density of tracks to destage in groups of tracks to select groups of tracks to destage.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

Current destaging techniques, known as Intelligent Write Caching (IWC) or Wise Order Writing (WOW), select tracks to destage based on both a temporality or time the track has been in cache, with an algorithm known as CLOCK, and based on the spatial location of the track, with an algorithm known as CSCAN. CLOCK is a Least Recently Used (LRU) based algorithm which demotes tracks that have been in the cache the longest, i.e., least recently used. To obtain CLOCK properties, the IWC maintains a temporal bit per track. The temporal bit gets set when the host writes a track. The temporal bit gets reset when a destage scan comes across a track with temporal bit set. If the destage scan finds a stride in a Redundant Array of Independent Disks (RAID) array with no tracks having the temporal bit set, than the destage scan can select that stride for destage. The CSCAN operation destages tracks based on spatial location. To obtain CSCAN properties, the IWC maintains a sorted list of modified tracks using a balanced tree (B-tree). The destage scan traverses the balanced tree to look for tracks at the nodes of the balanced tree to destage, where the balanced tree organizes tracks based on an order of track location from lowest to highest address.

There is a need in the art for improved techniques for destaging tracks in cache to storage.

SUMMARY

Provided are a computer program product, system, and method for considering a density of tracks to destage in groups of tracks to select groups of tracks to destage. Groups of tracks in the cache are scanned to determine whether they are ready to destage. A determination is made as to whether the tracks in one of the groups are ready to destage in response to scanning the tracks in the group. A density for the group is increased in response to determining that the group is not ready to destage. The group is destaged in response to determining that the density of the group exceeds a density threshold.

BRIEF DESCRIPTION OF THE DRAWINGS

FIG. 2 illustrates an embodiment of a group information of a group of tracks.

FIG. 3 illustrates an embodiment of track information for tracks in the cache.

FIG. 4 illustrates an embodiment of group set information on groups in a group set.

FIG. 5 illustrates an embodiment of a tree node of a node in a balanced tree.

FIG. 6 illustrates an embodiment of Redundant Array of Independent Disk (RAID) configuration information.

FIG. 7 illustrates an embodiment of a stride group providing information on a group of strides.

FIG. 8 illustrates an embodiment of rank information having information for stride groups of strides in a RAID rank.

DETAILED DESCRIPTION

Figure 1:
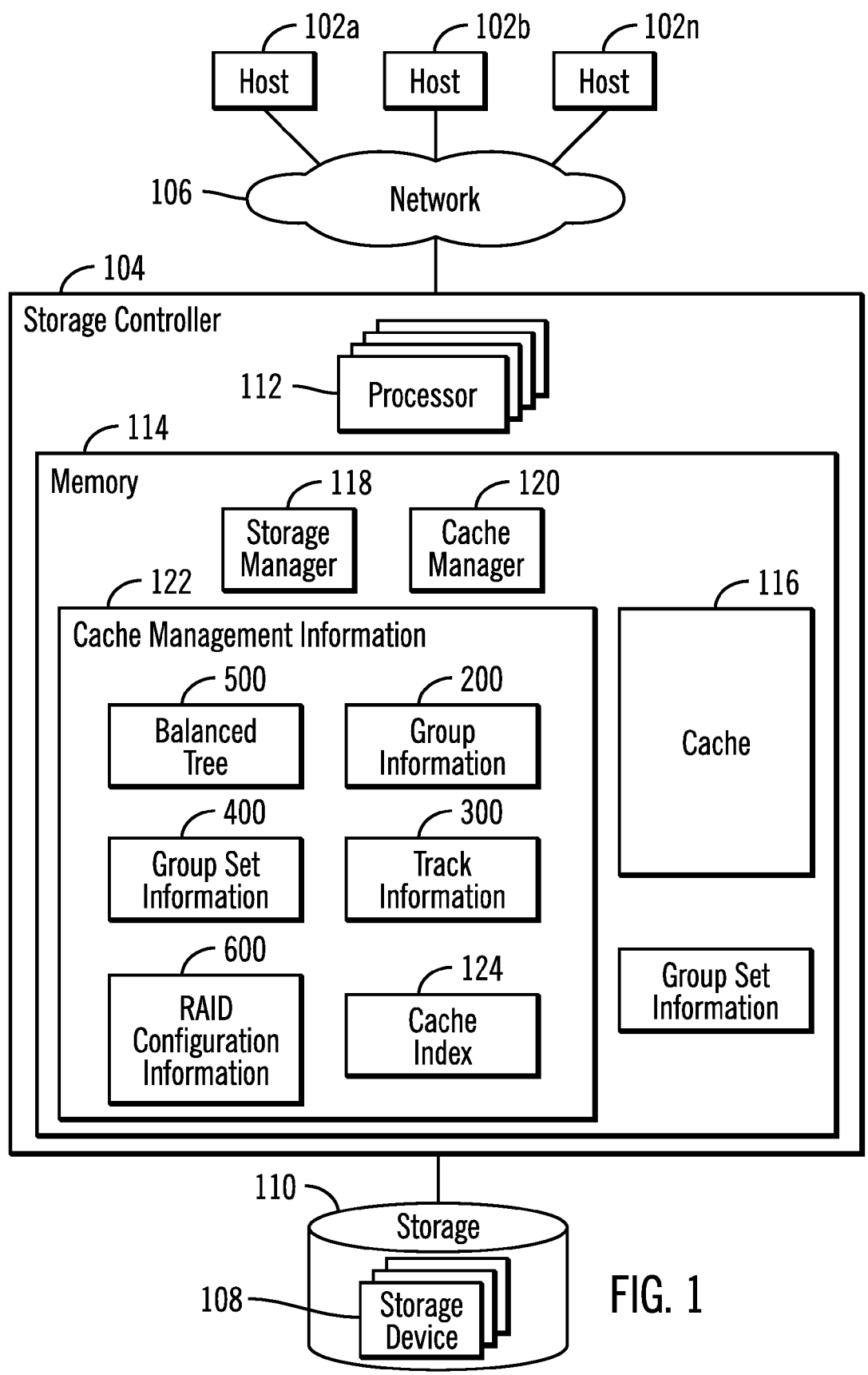
FIG. 1 illustrates an embodiment of a computing environment.

The above described techniques for destaging tracks from cache based on the least recently used track in cache and the spatiality with respect to a last destaged track do not take into account a density of a group of modified tracks in the cache to destage, where the density may reflect a number of consecutive tracks ready to destage as well as a duration in which the group of tracks has remained in cache.

The issue of the consecutive or sequential nature of the data being written or destaged is of particular concern for Solid State Storage Drives (SSDs), because SSDs experience write amplification. With write amplification, a single write to the SSD results in multiple writes to perform garbage collection to free up a block of pages of the SSD. If not all the cells in the pages of a block of SSD data are updated, then the non-modified cells need to be consolidated and rewritten to a new page to free up the pages having a combination of non-modified (valid) data and modified (stale) data updated at a new location. After garbage collection, the blocks from which valid data was written are then free to be available for further write data or garbage collection. Further, because the life of an SSD is based on the number of writes, limiting the effects of write amplification can increase the longevity of the NAND cells in the SSD. One way to reduce write amplification is to prefer writing data to sequential or consecutive addresses in the SSD or to have data modified at a similar frequency written to the same blocks of pages.

Described embodiments provide techniques to increase the likelihood of destaging tracks of data at consecutive addresses in a group of tracks to storage, such as SSDs, to realize benefits in writing data at consecutive addresses, such as experienced by SSDs. Other types of storage devices may also benefit from writing groups of tracks that tend to have more tracks ready to destage.

Described embodiments provide techniques for selecting groups of tracks to destage that have a greater density of tracks to destage over other groups of tracks. Groups of tracks in the cache are scanned to determine whether they are ready to destage. The groups may be comprised of tracks having data at consecutive addresses in storage. A determination is made as to whether the tracks in one of the groups of tracks indicate that the tracks in the group are ready to destage. A density for the group is increased in response to determining that at least one of the tracks in the group is not ready to destage. Density for a group may also be increased when a track transitions to a ready to destage state. A group of tracks not having all tracks ready to destage is destaged in response to determining that the density of the group exceeds a density threshold.

Further embodiments provide a technique for selecting groups of tracks to destage based on the frequency with which tracks in the cache have been modified. In one low frequency pass of scanning the groups of tracks, tracks may be selected for destage that have a modification frequency below a threshold and during a subsequent high frequency pass, tracks may be selected having a modification frequency higher than a threshold. This ensures that tracks are destaged that have a similar modification frequency profile. In this way, for SSD implementations, writing tracks at relatively the same time, or with similar modification frequency, minimizes the number of tracks that have to be moved when a new page is written as part of garbage collection because consecutive tracks in the same pages of the SSD storage blocks are updated at the same time and the updated cells on the same page do not have to be moved to a new garbage collection page.

In yet further embodiments, both density and frequency may be used to select tracks to destage to further increase the likelihood that consecutive tracks are updated at the same time. In SSD embodiments, updating consecutive tracks simultaneously in the same pages of a NAND block minimizes the number of cells and pages having non-modified data that need to be moved to a new page as part of garbage collection, thus minimizing write amplification.

FIG. 1 illustrates an embodiment of a computing environment. A plurality of hosts $102a$, $1022b$ . . . $102n$ may submit Input/Output (I/O) requests to a storage controller 104 over a network 106 to access data in storage devices 108 in a storage 110. The storage controller 104 includes a plurality of processors 112 and a memory 114, including a cache 116 to cache data for the storage 110. Each of the processors 112 may comprise a separate central processing unit (CPU), one or a group of multiple cores on a single CPU, or a group of processing resources on one or more CPUs. The cache 116 buffers data transferred between the hosts $102a$, $102b$ . . . $102n$ and the storage 110.

The memory 114 further includes a storage manager 118 for managing the transfer of tracks transferred between the hosts $102a$, $102b$ . . . $102n$ and the storage 110 and a cache manager 120 that manages data transferred between the hosts $102a$, $102b$ . . . $102n$ and the storage devices 108 in the cache 116. A track may comprise any unit of data configured in the storage devices 108, such as one or more logical addresses.

The cache manager 120 maintains cache management information 122 in the memory 114 to manage caching of data. The cache management information 122 may include group information 200 having information on tracks in one more groups of tracks stored in the storage 110; track information 300 having information on tracks in the cache 116; group set information 400 having information on the groups 200 organized as a set of groups; a balanced tree 500 of nodes representing an ordering of groups 200; a cache index 124 identifying tracks in the cache 116; and a Redundant Array of Independent Disk (RAID) configuration information 600 on the configuration of RAID arrays in the storage 110 if used.

The storage manager 118 and cache manager 120 are shown in FIG. 1 as program code loaded into the memory 114 and executed by one or more of the processors 112. Alternatively, some or all of the functions may be implemented in hardware devices in the storage controller 104, such as in Application Specific Integrated Circuits (ASICs).

The storage 110 may comprise one or more storage devices 108 known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts $102a$, $102b$ . . . $102n$ may connect to the storage controller 104 over a bus interface, such as a Peripheral Component Interconnect (PCI) bus interface and other interfaces known in the art.

In one embodiment, the storage devices 108 may comprise solid state drives (SSDs), and the storage manager 118 manages the data store in the storage devices 108 as a RAID array, where tracks in strides of the RAID array map to logical addresses in the storage devices 108. In alternative embodiment, the storage devices 108 may comprise other devices than SSDs or a combination of SSDs and other types of storage devices.

FIG. 2 illustrates an embodiment of an instance of a group $200_i$ in the group information 200, including a group identifier (ID) 202; a track list 204 comprising a linked list of tracks in the groups 204 that are in the cache 116; a density 206 of the group $200_i$; and a group frequency 208 indicating a number of times tracks in the group have been modified. The density 206 indicates a number of tracks in the group $200_i$ that are eligible to destage and an age of the tracks in the cache 116 in the group 200, or number of times the tracks have been passed over for destaging. Thus, the density 206 indicates an extent to which the tracks 204 in the group are ready to be destaged from the cache 116 to the storage 110.

FIG. 3 illustrates an instance of track information $300_i$ for one of the tracks in the cache 116, including a track identifier (ID) 302; one or more logical addresses 304 in the track 302 in the storage devices 108; a temporal indicator 306 indicating an extent to which the track 302 is ready to destage; and a frequency 308 indicating a number of times the track has been modified in the cache 116. In one embodiment, the temporal indicator 306 is incremented, such as by one, when the track 302 is modified or accessed in the cache 116, such as read or write access, and decremented, such as by one, when the track is retained in cache 116 after being scanned for destage.

FIG. 4 illustrates an embodiment an instance of group set information $400_i$ for one of the sets of groups, where groups may be organized into different group sets. An instance of group set information $400_i$ may include a group set identifier 402; indication of the groups 404 associated in the group set 402; a mean density 406 comprising a mean of all the densities 206 of the groups 404; a density standard deviation 408; a total frequency 410 indicating a number of times all the tracks in the cache 116 in the groups 404 have been modified; a total number of modified tracks 412 in the cache 116 in the groups 404; a mean frequency 414 comprising the total frequency 410 divided by the total number modified tracks 412; and a scan pass number 416 indicating a type of frequency criteria to use to determine whether to destage the tracks in the cache 116 associated in the group set $400_i$, such as a high or low frequency criteria.

FIG. 5 illustrates an embodiment of a tree node $500_i$ in the balanced tree 500, including a tree node identifier (ID) 502 identifying the node in the tree 500; a group ID 504 of a group $200_i$ associated with the node 502; a parent node 506 to the node 502 in the balanced tree 500; and one or more child nodes 508 of the node 504. In one embodiment, the balanced tree 500 may comprise a B tree.

In certain embodiments, the tracks in the storage 110 may be configured as a RAID array. FIG. 6 illustrates an embodiment of an instance of RAID configuration information $600i$ in the RAID information 600 for a RAID rank 602 configured in the storage devices 108 having a plurality of strides 604, and parity information 606 for the strides 604. Each stride 604 may have its own parity information for error correction of the data in the stride. The RAID information 600 is available when the groups of tracks comprise strides of tracks striped across the storage devices 108.

The groups 200 of tracks may comprise any grouping of tracks that are in the storage 110, such as groups of consecutive tracks, etc. Further, in certain embodiments the groups 200 may group further sub-groups of tracks. For instance, in RAID implementations, each group $200_i$ may comprise a plurality of strides, such as consecutive strides, in a RAID configuration. A stride is a unit in a RAID rank for which parity information is calculated according to a RAID level algorithm, and the tracks in the stride are striped across the data storage devices 108 in the array configuration. Tracks in the stripe on one of the storage devices 108 comprise a strip. The tracks in a strip may comprise consecutive addresses, and the strips in one stride striped to different storage devices 108 may be at the same logical address as strips in other storage devices 108 in the same stride.

FIG. 7 illustrates an embodiment of a group $200_i$ comprising a stride group $700i$ including a stride group identifier (ID) 702; strides 704 identifying strides in a rank of a RAID array associated with the stride group 702; a track list 706 comprising a linked list of tracks in the stride groups 704 that are in the cache 116; a density 708 of the strides 704; and a group frequency 710 indicating a number of times tracks 706 in the group 702 have been modified. The density 708 and frequency 710 may be calculated and used in the same manner as the group density 206 and group frequency 708 in FIG. 2, but are instead calculated for the tracks 706 in all the strides 704 in the cache 116 associated with the stride group $700_i$.

FIG. 8 illustrates an embodiment of the group set information $400_i$ of FIG. 4 as comprising rank information $800_i$ for a RAID rank having a plurality of strides. In such RAID embodiments, the rank information $800_i$ may include a rank identifier 802; indication of the strides groups 804 associated with strides in the rank 802; a mean density 806 comprising a mean of all the stride densities 708 of the stride groups $700_i$; a standard deviation 808 of the mean density 806; a total frequency 810 indicating a number of times all the tracks in the cache 116 in all the stride groups 804 of strides in the rank 802 have been modified; a total number of modified tracks 812 in the cache 116 in the stride groups $700_i$ including strides in the rank 802; a mean frequency 814 comprising the total frequency 810 divided by the total number modified tracks 812; and a scan pass number 816 indicating a type of frequency criteria to use to determine whether to destage the tracks in the cache 116 associated in the group set $400_i$, such as a low or high frequency criteria.

Figure 9:
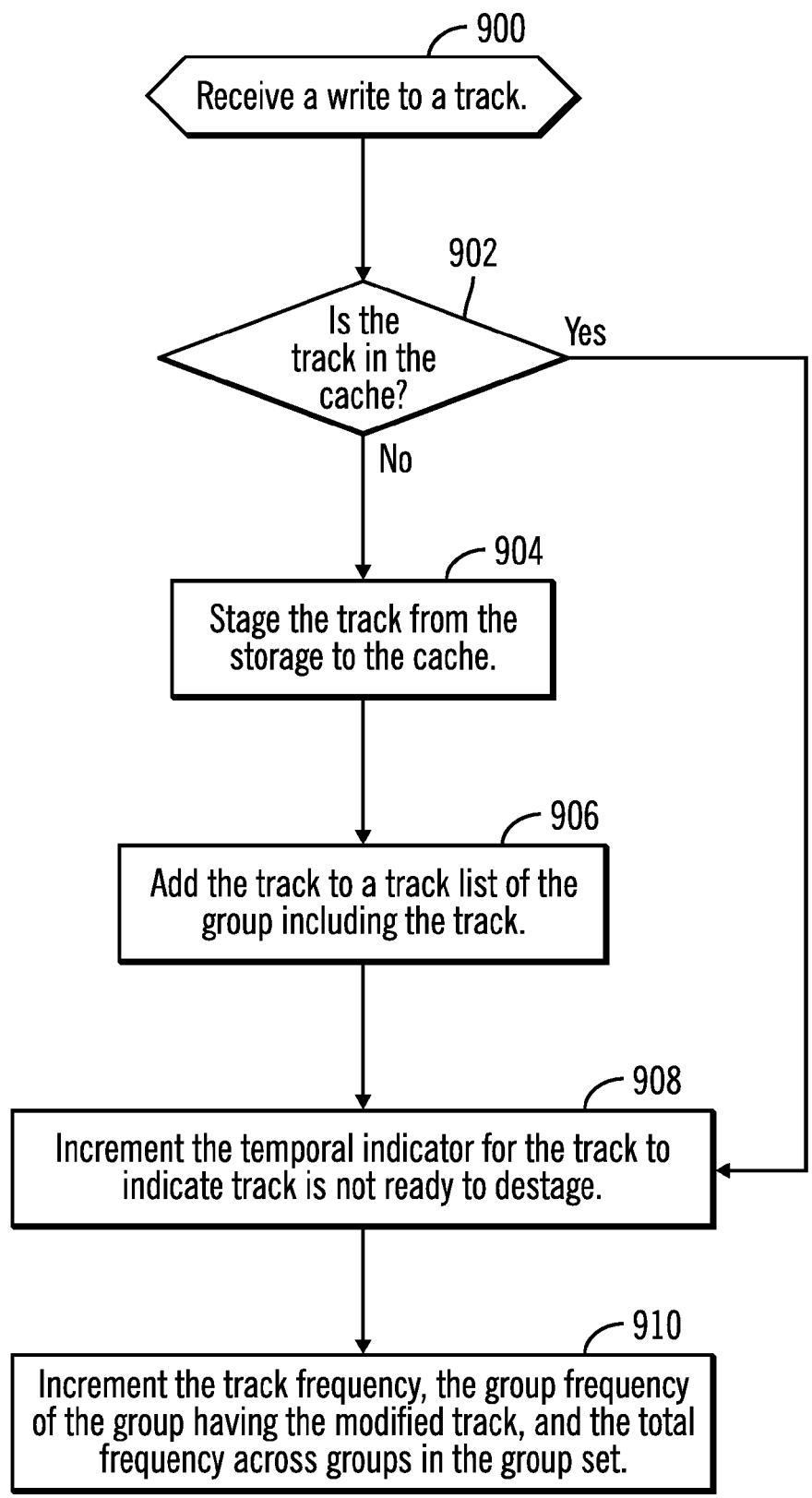
FIG. 9 illustrates an embodiment of operations to process a write to a track.

FIG. 9 illustrates an embodiment of operations performed by the cache manager 120 to process requests to tracks. Upon receiving (at block 900) a write to a track, if (at block 902) the track is not in the cache 116, then the requested track is staged (at block 904) from the storage 110 to the cache 116. The identity of the track is added (at block 906) to the track list 206 in the group $200_i$ including the track 204. After the track is in cache 116 (from the yes branch of block 902 or block 906), the temporal indicator 306 for the track is incremented (at block 908) to indicate the track is not ready to destage. Further, the track frequency 308, group frequency 208 of the group having the modified track, and the total frequency 410 across groups in the group set are incremented to indicate the number of times the track has been modified.

Figure 10:
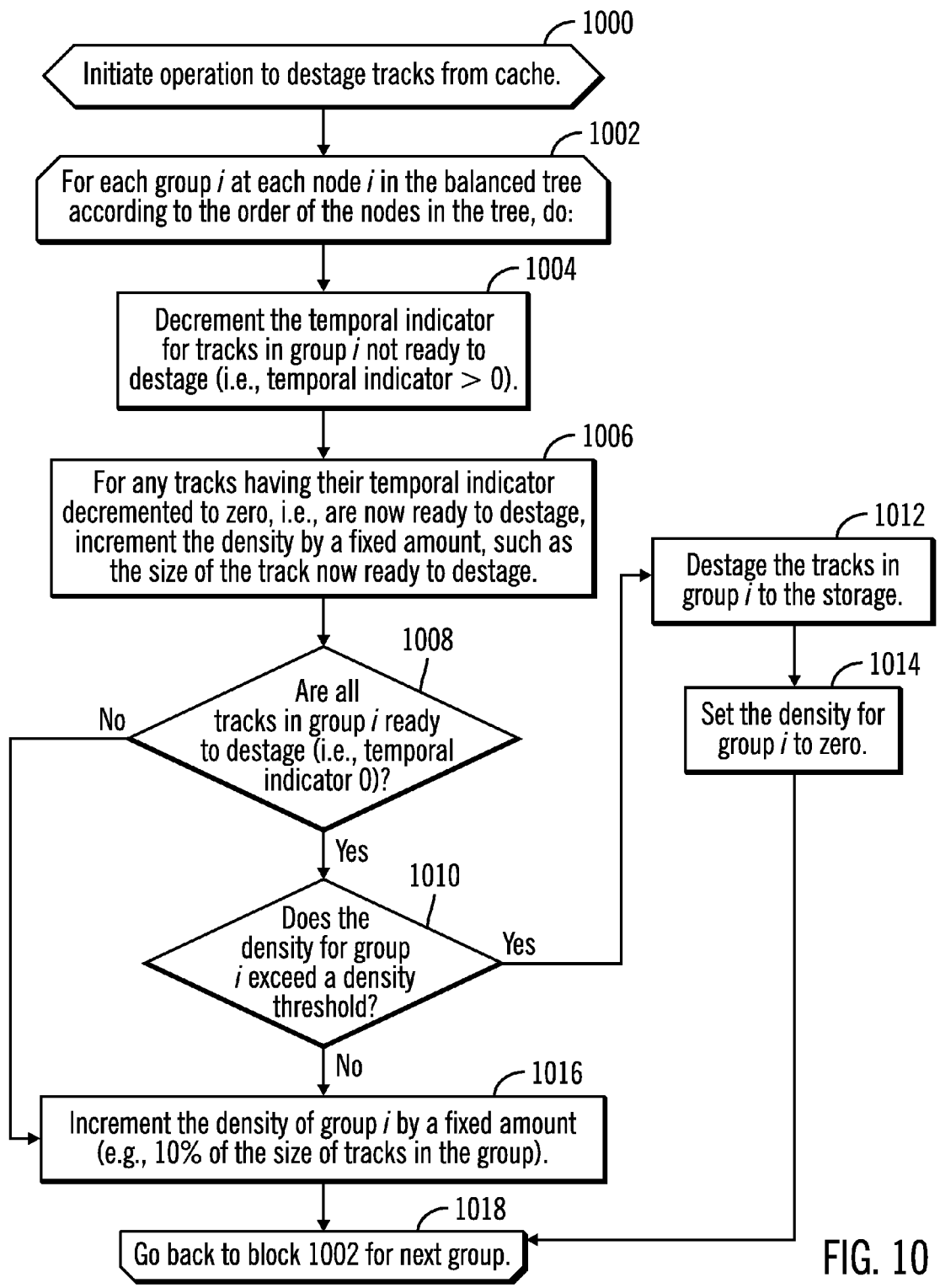
FIG. 10 illustrates an embodiment of operations to select a group of tracks in cache to destage to storage using a group density of tracks in the cache.

FIG. 10 illustrates an embodiment of operations performed by the cache manager 120 to destage tracks organized into groups taking into account just the group density 206, not the frequency 208. The groups $200_i$ are processed in the order of the nodes $500_i$ in the tree 500 to which the groups 200 are assigned. Groups $200_i$ may be assigned to nodes $500_i$ to order the tracks 204 in the groups according to a consecutive track order. In RAID implementations, the nodes $500_i$ may order the stride groups $700_i$ according to an ordering of the strides 704 in the stride groups 702, so that the nodes provide a consecutive ordering of strides in the RAID rank. Upon initiating (at block 1000) the operation to destage tracks, a loop of operations is performed from blocks 1002 through 1018 for each of the groups 200 of tracks according to the order of the nodes assigned the groups.

At block 1004, the cache manager 120 decrements the temporal indicator 306 for the tracks in the group i that are not ready to destage, such as the tracks having a temporal indicator 306 greater than zero. The temporal indicator 306 may be decremented by one. For any tracks having their temporal indicator 306 decremented to zero, the density 206 for the group i is incremented (at block 1006) by a fixed amount, such as the size of the track now ready to destage as a result of the decrementing of the temporal indicators 306 in block 1004. If (at block 1008) all the tracks in group i are ready to destage, which may be indicated when the temporal indicator 306 for all the tracks in the track list 204 for group i are zero, then the cache manager 120 determines (at block 1010) whether the density 206 for group i exceeds a density threshold, such as the mean density of the groups 406 for the group set including group i.

If (at block 1010) the density threshold is satisfied, then the cache manager 112 destages (at block 1012) the tracks 204 in group i in the cache 116 to the storage 110. The density 206 for group i whose tracks in cache 116 are destaged is set (at block 1014) to zero.

If (at block 1010) the density 206 does not exceed the density threshold, e.g., mean density 406 or if (at block 1008) all the tracks in group i are not ready to destage, i.e., temporal indicator 406 is not zero, then the density 206 for group i is incremented (at block 1016) by a fixed amount, such as a percentage of the size of all the tracks in the group. Increasing the density 206 increases the likelihood that the tracks in group i will be destaged the next time the balanced tree 500 is scanned. From blocks 1014 or 1016, control proceeds to block 1018 to process a next node $500_i$ in the balanced tree 500 to process a next group $200_i$ to determine whether to destage.

In embodiments where the groups $200_i$ comprise stride groups $700_i$, the logic of FIG. 10 determines whether to destage the tracks 706 in the strides 704 in the stride group $700_i$ based on the temporal indicators 306 in the tracks 706 and the stride group density 708. The density threshold may comprise a mean density 806 of the stride groups in the rank having the strides 704 in stride group $700_i$ being processed With the described operations of FIG. 10, groups having more tracks ready to destage and having been in cache longer, i.e., having gone through the scanning operations of FIG. 10, will have a higher density which makes them more eligible for destaging, i.e., having a density exceeding a density threshold. The density 206 for the group may be incremented when a track in the group reaches a point where it is ready to destage, such as the temporal indicator 306 transitioning to being set to zero or if after all tracks in the group are scanned, the group is still not destaged. Tracks in the group may have their temporal indicator 306 incremented when they are read or write accessed in the cache 116 and decremented if they are scanned during the destage process without being destaged. Thus, the density for a group, such as a stride, indicates both an extent to which the tracks are ready to destage and how long the group of tracks has remained in the cache 116. A higher density indicates a higher imperative to destage the tracks. Tracks in a group having higher density may more likely be tracks mapping to consecutive addresses in the storage devices 108. In embodiments where the storage devices 108 comprise SSDs, disk performance is optimized by destaging more tracks at consecutive logical addresses, which is more likely to occur with a high density group, because write amplification at the SSDs is reduced by writing tracks having greater sequentially.

In a further embodiments, the tracks in a group may be destaged if the tracks in the cache 116 for a group are all sequential or at consecutive addresses in the storage devices 108 regardless of density because destaging such a group having all consecutive tracks in cache would result in the benefits of writing data to consecutive addresses, such as benefits SSD devices by reducing write amplification.

Figure 11:
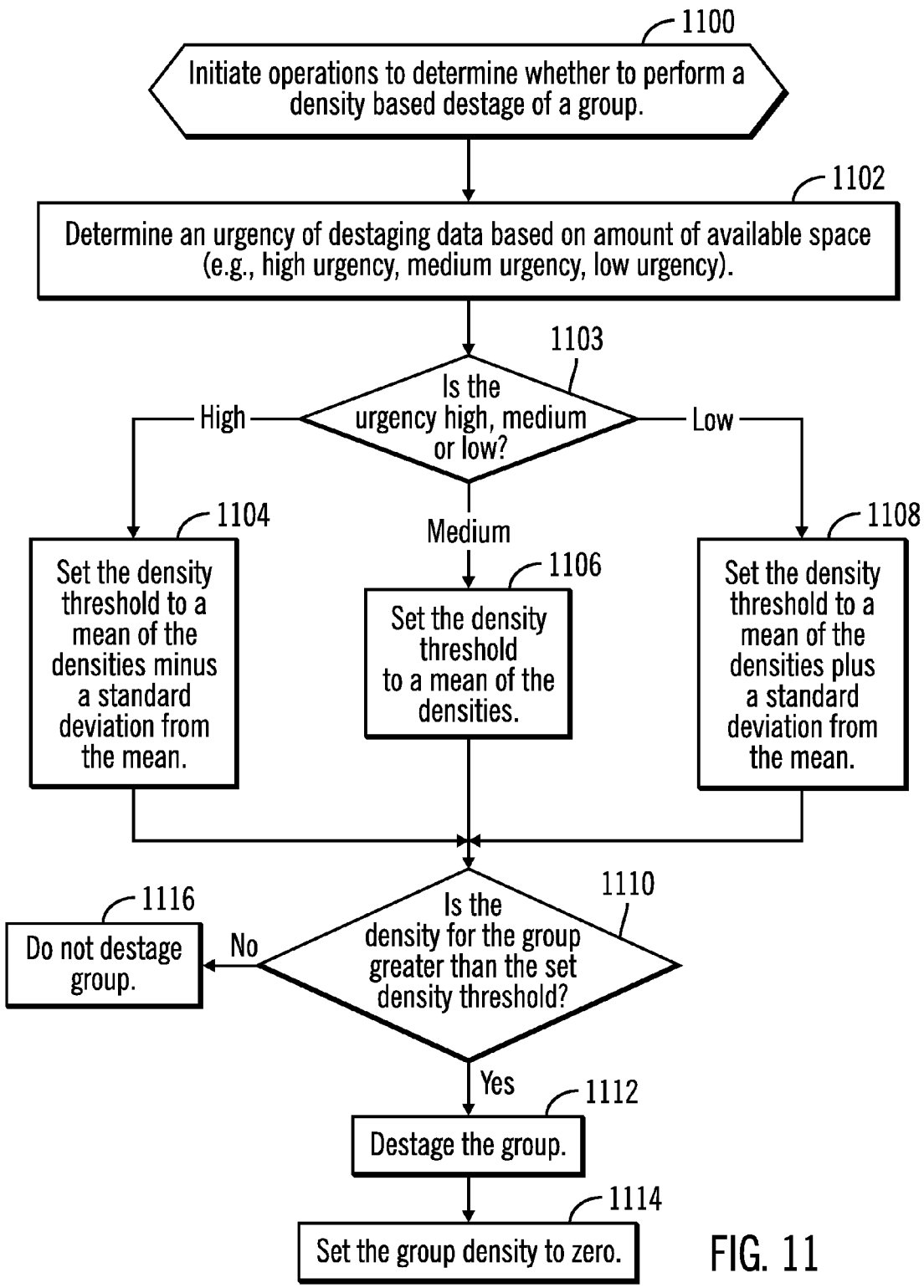
FIG. 11 illustrates an embodiment of operations to destage a group of tracks based on a group density and urgency to destage tracks from the cache.

FIG. 11 illustrates an embodiment of operations performed by the cache manager 120 to perform the operations at block 1010 to determine whether based on the density a group of tracks should be destaged. Upon initiating (at block 1100) an operation to determine whether to perform a density based destaging of a group of tracks, the cache manager 120 determines (at block 1102) an urgency of destaging data based on amount of available space (e.g., high urgency, medium urgency, low urgency). In one embodiment, the urgency may be based on an amount of available space in the cache 116. In RAID implementations, the urgency may vary based on number of ranks having strides in the cache 116 as well as availability, such that tracks from more ranks in the cache 116 may create a greater urgency than if there are fewer ranks having tracks in the cache 116.

If (at block 1103) the urgency is high, then the density threshold is set (at block 1104) to a mean 406, 806 of the densities for all groups having tracks in the cache 116 minus a standard deviation 408, 808 from the mean. If (at block 1103) the urgency is medium, then the density threshold is set (at block 1106) to a mean of the densities 406, 806 of the groups having tracks in the cache 116. If (at block 1103) the urgency is low, then the density threshold is set (at block 1108) to a mean of the densities for all groups having tracks in the cache 116 plus a standard deviation from the mean. In this way, the higher the urgency, the lower the threshold requirement is set.

If (at block 1110) the density for the group is greater than the set density threshold, i.e., set at block 1104, 1106, 1108, then the tracks in the cache 116 for the group are destaged (at block 1112) to the storage 110 and the group density 206 is set (at block 1114) to zero. If (at block 1110) the group density 206 does not exceed the set density threshold, then the group is not destaged (at block 1116).

With the described embodiments of FIG. 11, depending on the urgency or need to destage tracks from cache 116, a density threshold is set, to make the threshold relatively higher if the urgency is low and relatively lower if the urgency is high, to perform a density based destage operation. The density based destage ensures that groups of tracks that have been in cache 116 for relatively longer and/or that have relatively more tracks ready for destage have a greater likelihood of exceeding the density threshold and be destaged even when such groups do not have all their tracks ready for destage.

Figure 12:
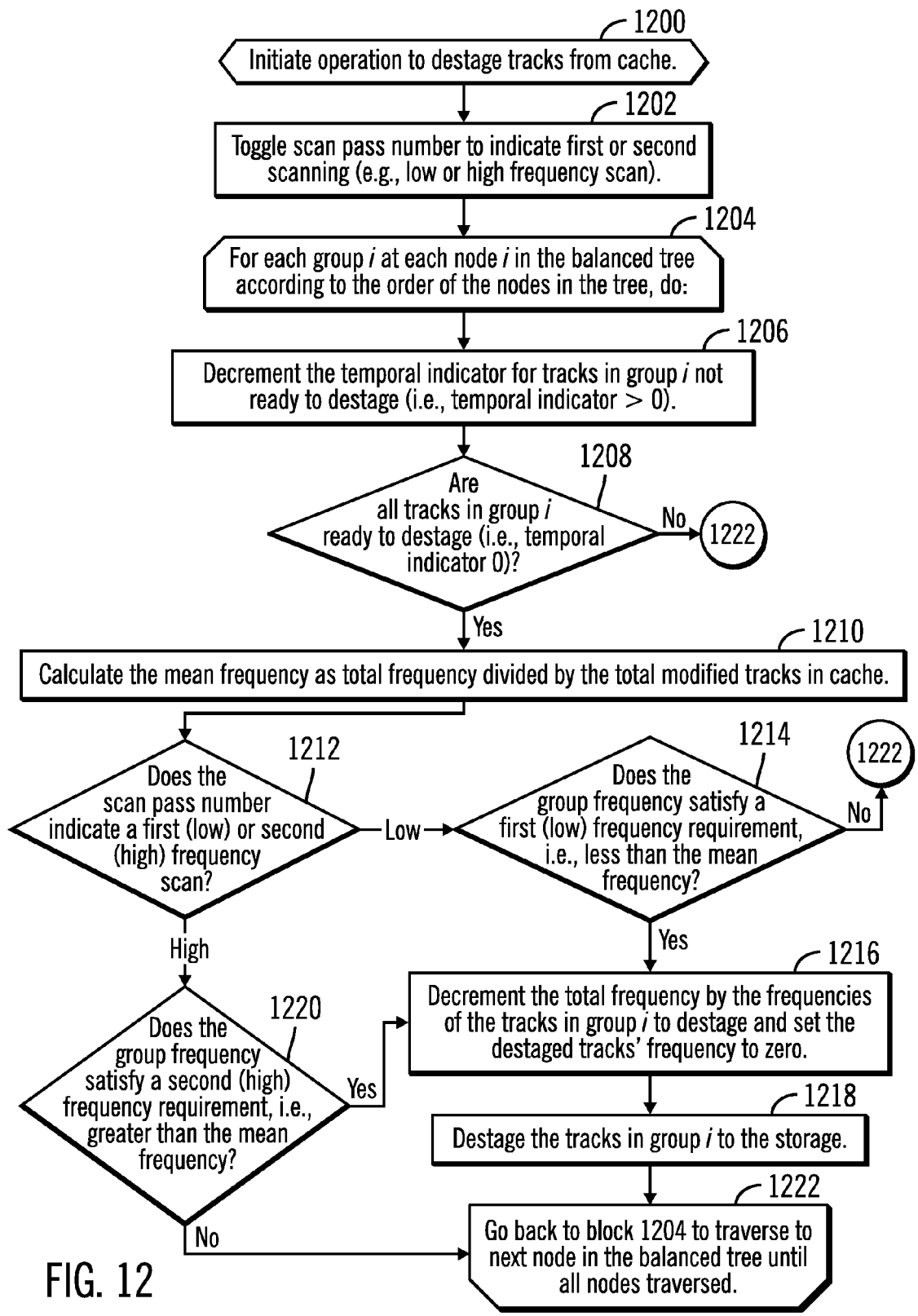
FIG. 12 illustrates an embodiment of operations to destage a group of tracks from cache based on a frequency that the tracks in the group are modified.

FIG. 12 illustrates an additional embodiment of operations performed by the cache manager 120 to determine groups 200 of tracks to destage based on a frequency with which tracks in a group $200_i$ are modified. The groups $200_i$ are processed in the order of the nodes $500_i$ in the tree 500 to which the groups 200 are assigned. Groups $200_i$ may be assigned to nodes $500_i$ to order the tracks 204 in the groups according to a consecutive order. In RAID implementations, the nodes $500_i$ may order the stride groups $700_i$ according to an ordering of the strides 704 in the stride groups 702, so that the nodes provide a consecutive ordering of strides in the RAID rank. Upon initiating (at block 1200) the operation to destage tracks based on the frequency at which tracks are modified, the cache manager 120 toggles (at block 1202) the scan pass number 416, 816 indicating whether to perform a high frequency or low frequency scan, so that the cache manager 120 alternates between performing scanning based on a high and low frequency criteria.

The cache manager 120 performs a loop of operations at blocks 1204 through 1222 for each of the groups of tracks according to the order of the nodes 500 assigned the groups 200. The cache manager 120 decrements (at block 1206) the temporal indicator 306 for the tracks in the group i that are not ready to destage, such as the tracks having a temporal indicator 306 greater than zero. The temporal indicator 306 may be decremented by one. If (at block 1208) all the tracks in group i are not ready to destage, which may be indicated when the temporal indicator 306 for all the tracks in the track list 204 for group i are not zero, then the cache manager 120 proceeds to block 1222 to consider the next group i in the balanced tree 500. If (at block 1208) all the tracks 204 in the group i are ready to destage, then the cache manager 120 calculates (at block 1210) the mean frequency 414 as total frequency 410 for all tracks in all the groups in the group set 400i having group i divided by the total number of modified tracks 412 in the groups 404 in the group set 402 including group i that are in the cache 116.

The cache manager 120 determines (at block 1212) whether the scan pass number 416 indicates a first or second type of scan, e.g., low or high frequency scan. type of frequency criteria, e.g., low frequency, then the cache manager 120 determines (at block 1214) whether the group i frequency 208 satisfies the low frequency requirement, such as is less than the mean frequency 414 for all groups 200 in the group set 400$_i$. If (at block 1214) the first (low) frequency requirement is not satisfied, then control proceeds to block 1222 to consider the next group i in the balanced tree. If (at block 1214) the low frequency requirement is satisfied, then the cache manager 120 decrements (at block 1216) the total frequency 410 by the frequencies 208 of the tracks in group i to destage and set the destaged tracks' frequency 308 to zero. The tracks in the cache 116 for group i are then destaged (at block 1218) and control proceeds to block 1222 to consider the next group i.

If (at block 1214) the scan pass number 414 indicates a second scanning, such as a high frequency criteria, then the cache manager 120 determines (at block 1220) whether the group i frequency 208 satisfies a second (high) frequency requirement, e.g., exceeds the mean frequency 414. If so, then control proceeds to block 1216 to destage the tracks in group i, otherwise, control proceeds to block 1222 to consider the next node 500$_i$ in the balanced tree 500 until all nodes are considered.

In embodiments where the groups 200$_i$ comprise stride groups 700$_i$, the logic of FIG. 12 determines whether to destage the tracks 706 in the strides 704 in the stride group 700$_i$ based on the temporal indicators 306 in the tracks 706 and the frequency 710 of the group indicating the number of times tracks in the strides 704 in the stride group 700$_i$ have been modified. The mean frequency may comprise a mean frequency 814 of the stride groups 804 in the rank 802 having the strides 704 in stride group 700$_i$ being processed during the low or high frequency scanning.

With the embodiment of FIG. 12, tracks with similar write or modification frequency are written together. For implementations where the storage devices 108 comprise SSDs, the embodiment of FIG. 12 increases the likelihood that consecutive tracks having a similar frequency are written to the same pages in blocks of the SSD NAND cells. This makes it more likely the tracks will all be rewritten at the same time, leaving fewer unmodified cells in the pages that need to be subject to garbage collection during subsequent writes. Reducing the number of pages that need to be subject to garbage collection reduces write amplification and prolongs the life of SSD devices.

Figure 13A:
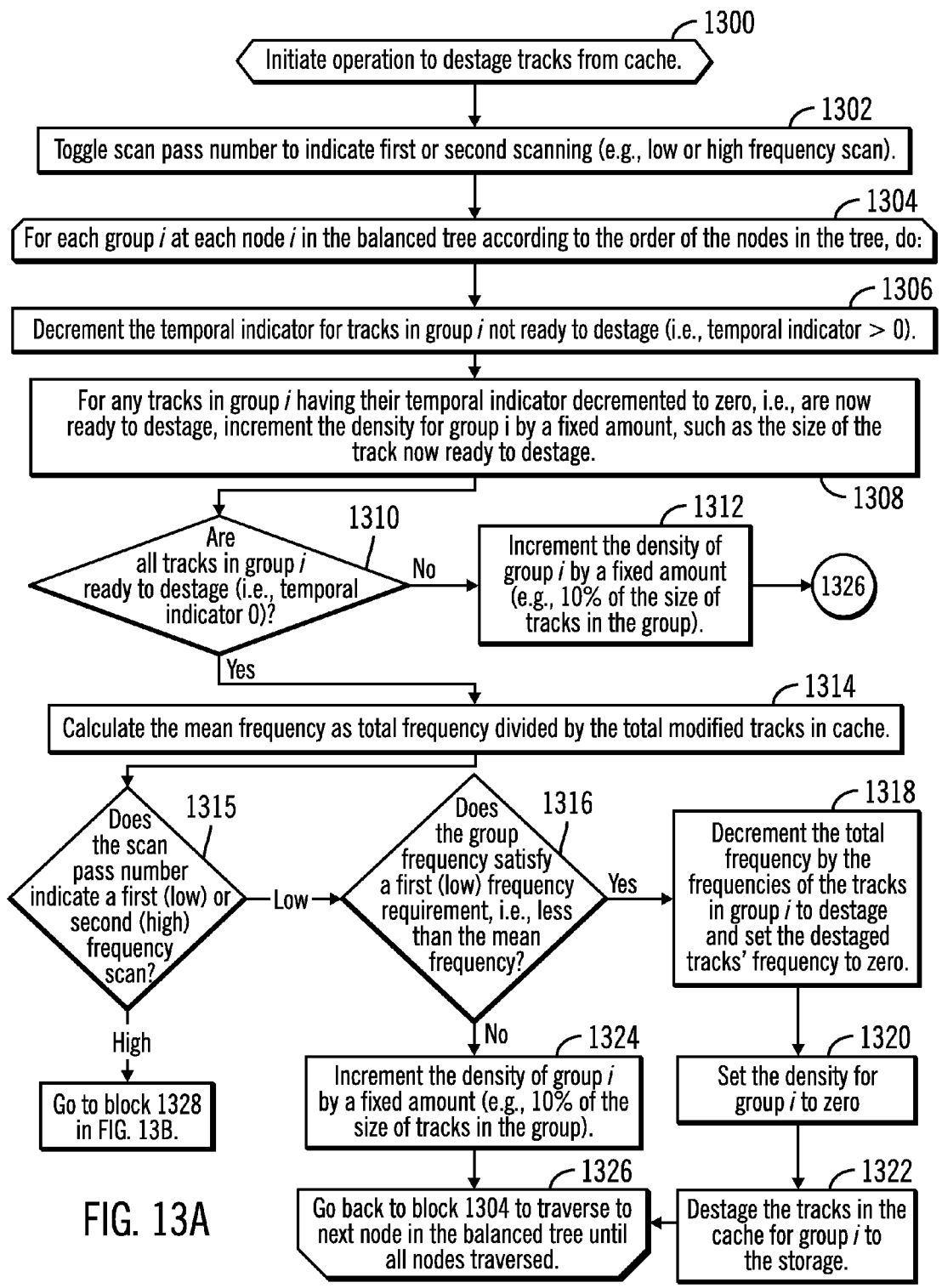
FIGS. 13a and 13b illustrate an embodiment of operations to destage a group of tracks from cache based on a frequency that the tracks in the group are modified and a density of the tracks in the cache for the group.
Figure 13B:
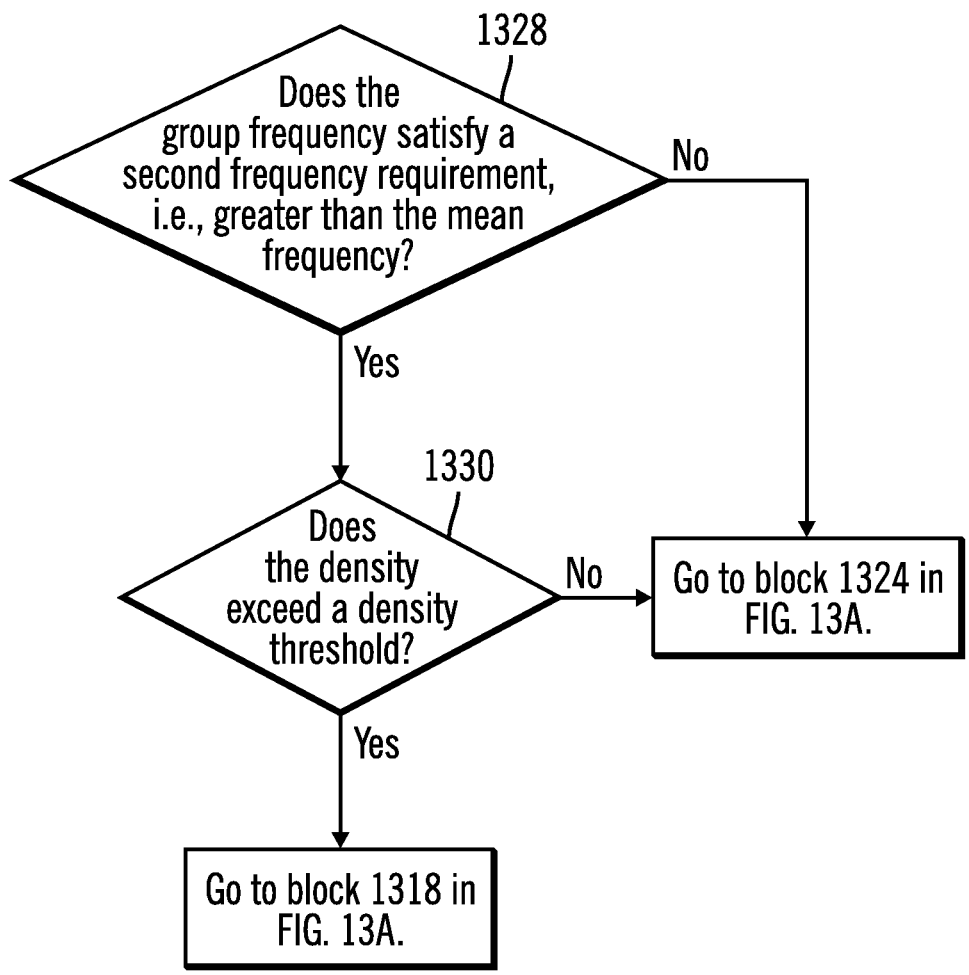

FIGS. 13a and 13b illustrate an additional embodiment of operations performed by the cache manager 120 to determine groups 200 of tracks to destage based on both a frequency 208 with which tracks in a group 200$_i$ are modified and a density 206 of the group. The groups 200$_i$ are processed in the order of the nodes 500$_i$ in the tree 500 to which the groups 200 are assigned. Groups 200$_i$ may be assigned to nodes 500$_i$ to order the tracks 204 in the groups according to a consecutive order. In RAID implementations, the nodes 500$_i$ may order the stride groups 700$_i$ according to an ordering of the strides 704 in the stride groups 702, so that the nodes provide a consecutive ordering of strides in the RAID rank.

Upon initiating (at block 1300) the operation to destage tracks based on both frequency and density, the cache manager 120 toggles (at block 1302) the scan pass number 416 indicating whether to perform a high frequency or low frequency scan, so that the cache manager 120 alternates between performing scanning based on a high and low frequency criteria. The cache manager 120 performs a loop of operations at blocks 1304 through 1326 for each of the groups of tracks according to the order of the nodes 500 assigned the groups 200. The cache manager 120 decrements (at block 1306) the temporal indicator 306 for the tracks in group i that are not ready to destage, such as the tracks having a temporal indicator 306 greater than zero. The temporal indicator 306 may be decremented by one. For any tracks having their temporal indicator 306 decremented to zero, the density 206 for group i is incremented (at block 1308) by a fixed amount, such as the size of the track now ready to destage as a result of the decrementing of the temporal indicators 306 in block 704.

If (at block 1310) all the tracks in group i are not ready to destage, which may be indicated when the temporal indicator 306 for all the tracks in the track list 204 for group i are not zero, then the cache manager 120 increments (at block 1312) the density 206 for group i by a fixed amount, such as a percentage of the size of all the tracks in the group. Increasing the density 206 increases the likelihood the tracks in group i will be destaged the next time the balanced tree 500 is scanned. From blocks 1312, control proceeds to block 1326 to process a next node 500$_i$ in the balanced tree 500 to process a next group 200$_i$ to determine whether to destage.

If (at block 1310) all the tracks in group i are ready to destage, then the cache manager 120 calculates (at block 1314) the mean frequency 414 as total frequency 410 for all tracks in all the groups in the group set 400i having group i divided by the total number of modified tracks 412 in the groups 404 in the cache 116. If (at block 1315) the scan pass number 416 indicates a first type of frequency criteria, e.g., low frequency, then the cache manager 120 determines (at block 1316) whether the group i frequency 208 satisfies the low frequency requirement, such as is less than the mean frequency 414 in the group set 400$_i$. If (at block 1316) the low frequency requirement is satisfied, then the cache manager 120 decrements (at block 1318) the total frequency 410 by the frequencies 208 of the tracks in group i to destage and sets the destaged tracks' frequency 308 to zero. The density 206 for group i having the destaged tracks is set (at block 1320) to zero. The tracks in the cache 116 for group i are destaged (at block 1322) and control proceeds to block 1326 to consider the next group i.

If (at block 1316) the first (low) frequency requirement is not satisfied, then the density 206 for group i is incremented (at block 1324) by a fixed amount, such as a percentage of the size of all the tracks in the group. Increasing the density 206 increases the likelihood the tracks in group i will be destaged the next time the balanced tree 500 is scanned.

If (at block 1315) the scan pass number 416 indicates a second scanning, such as a high frequency criteria, control proceeds to block 1328 in FIG. 13b where the cache manager 120 determines whether the group i frequency 208 exceeds the mean frequency 414. If so, then the cache manager 120 determines (at block 1330) whether the density 206 for group i exceeds a density threshold, such as the mean density of the groups 406 for the group set including group i. If both the high frequency and density requirements are satisfied, then control proceeds to block 1318 in FIG. 13a to destage the tracks 204 in group i. Otherwise, if either the high frequency or density requirements are not satisfied, then control proceeds to block 1324 in FIG. 13a to increment the density 206 and consider the next group i in the balanced tree 500.

In embodiments where the groups $200_i$ comprise stride groups $700_i$, the logic of FIGS. 13a and 13b determines whether to destage the tracks 706 in the strides 704 in the stride group $700_i$ based on the temporal indicators 306 in the tracks 706, the frequency 710 of the group indicating the number of times tracks in the strides 704 in the stride group $700_i$ that have been modified, and the density 708 of the strides indicating a denseness of the consecutive tracks in the strides 704 of a stride group $700_i$ ready for destage. The mean frequency may comprise a mean frequency 814 of the stride groups 804 in the rank 802 having the strides 704 in stride group $700_i$ being processed during the low or high frequency scanning and the density threshold may comprise the mean density of the stride groups 806 in the rank information 802. Further, the determination of whether the density threshold is exceeded may be performed according to the operations of FIG. 11 considering both mean density of the stride groups 806 and the standard deviation 808 from the mean density 806.

With the embodiment of FIGS. 13a and 13b, tracks with similar write or modification frequency are written together. For implementations where the storage devices 108 comprise SSDs, the embodiment of FIGS. 13a and 13b increases the likelihood that consecutive tracks having a similar frequency are written to the same pages in blocks of the SSD NAND cells. This makes it more likely the tracks will all be rewritten at the same time, leaving fewer unmodified cells in the pages that need to be subject to garbage collection. Further, destaging tracks (or strides of tracks) having a greater density, or a greater number of consecutive modified tracks in the cache 114 further makes it more likely tracks will be written as groups and will fill the pages to reduce the likelihood that after destaging there is valid unmodified data in the cells that need to be subject to garbage collection. Reducing the number of pages that need to be subject to garbage collection reduces the write amplification and prolongs the life of SSD devices.

Although in certain embodiments, the storage devices 108 are described as being SSDs, the described embodiments and operations may apply to other type of storage devices. The described embodiments provide specific uses of density and frequency as criteria to determine when to destage tracks in the cache. In alternative embodiments, different combinations of density and/or frequency criteria may be used to select tracks to destage to increase the likelihood that consecutive tracks will be destaged and that consecutive tracks having a similar modification frequency be destaged in groups.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
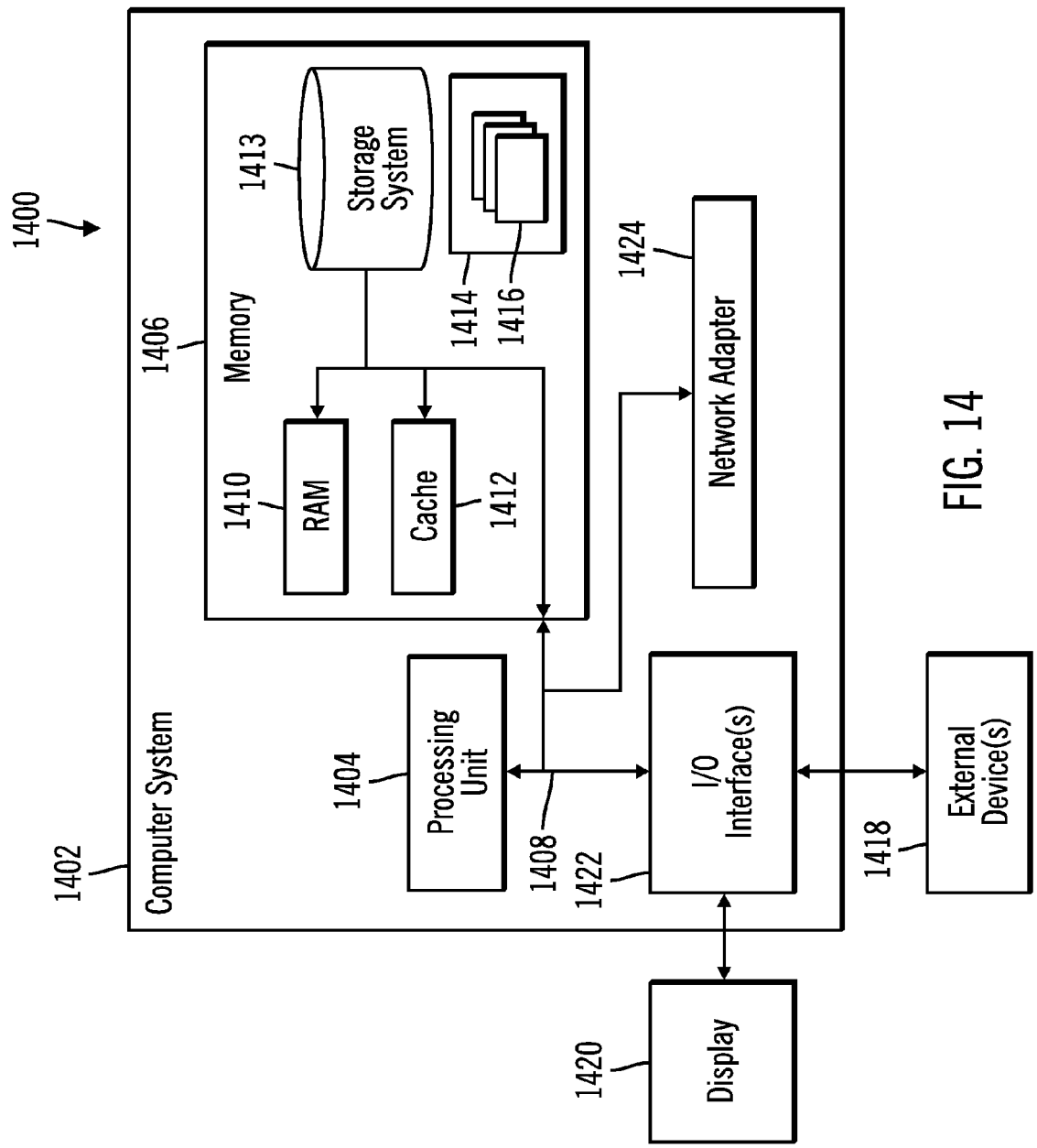
FIG. 14 illustrates a computing environment in which the components of FIG. 1 may be implemented.

The computational components of FIG. 1, including the hosts 102a, 102b . . . 102n and storage controller 104, may be implemented in one or more computer systems, such as the computer system 1402 shown in FIG. 14. Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system/server 1402 is shown in the form of a general-purpose computing device.

The components of computer system/server 1402 may include, but are not limited to, one or more processors or processing units 1404, a system memory 1406, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. The components of the computer 1402 may be implemented as program modules 1416 which generally carry out the functions and/or methodologies of embodiments of the invention as described herein. The systems of FIG. 1 may be implemented in one or more computer systems 1402, where if they are implemented in multiple computer systems 1402, then the computer systems may communicate over a network.

Computer system/server 1402 may also communicate with one or more external devices 1418 such as a keyboard, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for selecting tracks to destage from a cache to a storage, the computer program product comprising a computer readable storage medium having computer readable program code embodied therein that when executed performs operations, the operations comprising:

scanning groups of tracks in the cache to determine whether they are ready to destage;
  determining whether the tracks in a group of tracks of the groups of tracks are ready to destage in response to scanning the tracks in the group of tracks;
  increasing a density for the group of tracks in response to determining that the group of tracks is not ready to destage;
  determining an urgency for destaging data based on an amount of available space in the cache, comprising one of a high urgency, medium urgency or low urgency;
  destaging the groups of tracks having the density greater than a mean of densities of the groups of tracks plus a standard deviation of the mean in response to determining the urgency comprises the low urgency;
  destaging the groups of tracks having the density greater than the mean in response to determining the urgency comprises the medium urgency; and
  destaging the groups of tracks having the density greater than the mean minus the standard deviation in response to determining the urgency comprises the high urgency.

2. The computer program product of claim 1, wherein the operations further comprise:

maintaining a balanced tree of nodes representing the groups of tracks, wherein the groups of tracks in the balanced tree are ordered according to an ordering of addresses of the tracks in the groups, wherein each group of tracks is comprised of tracks having consecutive addresses in the storage;
  wherein the scanning of the tracks comprises:
  traversing the balanced tree to access each of the groups of tracks according to the ordering of the balanced tree; and
  in response to accessing one of the groups of tracks, processing the tracks in the group to determine whether to destage the group of tracks.

3. The computer program product of claim 1, wherein there is a temporal indicator for each of the tracks indicating whether a track is ready to destage, wherein the operations further comprise:

increasing the density for the group of tracks in response to the temporal indicator for one of the tracks in the group of tracks transitioning from being not ready to destage to being ready to destage.

4. The computer program product of claim 3, wherein the operations further comprise:

incrementing the temporal indicator for one of the tracks in the cache in response to receiving a write to the track; and
  decrementing the temporal indicator for one of the tracks in the cache in response to processing the group of tracks including the track for destage.

5. The computer program product of claim 1, wherein the mean of densities is based on densities for all the groups of tracks having tracks in the cache.

6. The computer program product of claim 5, wherein the mean of densities is based on a mean of densities of all the groups of tracks in the cache.

7. The computer program product of claim 1, wherein the increasing the density comprises incrementing the density for the group of tracks by a fixed amount in response to determining not to destage the group of tracks.

8. The computer program product of claim 1, wherein the increasing the density comprises increasing the density by a size of one of the tracks in response to a track transitioning from a state of not being ready to destage to a state of being ready to destage.

9. The computer program product of claim 1, wherein the operations further comprise: setting the density for the group of tracks to zero in response to destaging all of the tracks in the group of tracks to the storage.

10. The computer program product of claim 1, wherein the tracks are configured in a Redundant Array of Independent Disks (RAID) array in the storage, and wherein each of the groups of tracks comprise a stride of tracks for which parity is computed in the RAID array, wherein strides of tracks are striped across storage devices in the storage.

11. The computer program product of claim 10, wherein the storage devices comprise of a plurality of solid state drives (SSD), and wherein the tracks in each of the strides comprise tracks having consecutive logical addresses in the SSDs.

12. The computer program product of claim 10, wherein the operations further comprise:
maintaining a balanced tree of nodes, wherein each node is associated with a stride group indicating at least one of the strides and the tracks in the at least one of the strides, wherein the nodes in the balanced tree are ordered according to an ordering of addresses of the tracks in the strides indicated in the stride groups associated with the nodes,
wherein the scanning of the tracks comprises:
traversing the nodes of the balanced tree to access each of the stride groups at the traversed nodes according to the ordering of the balanced tree; and
in response to accessing one of the stride groups, processing the tracks in the at least one stride indicated in the stride group to determine whether the tracks in the stride group are ready to destage.

13. A system in communication with a storage, comprising:
a processor;
a cache; and
a computer readable storage medium having computer program code that when executed by the processor perform operations, the operations comprising:
scanning groups of tracks in the cache to determine whether they are ready to destage;
determining whether the tracks in a group of tracks of the groups of tracks are ready to destage in response to scanning the tracks in the group of tracks;
increasing a density for the group of tracks in response to determining that the group of tracks is not ready to destage;
determining an urgency for destaging data based on an amount of available space in the cache, comprising one of a high urgency, medium urgency or low urgency;
destaging the groups of tracks having the density greater than a mean of densities of the groups of tracks plus a standard deviation of the mean in response to determining the urgency comprises the low urgency;
destaging the groups of tracks having the density greater than the mean in response to determining the urgency comprises the medium urgency; and
destaging the groups of tracks having the density greater than the mean minus the standard deviation in response to determining the urgency comprises the high urgency.

14. The system of claim 13, wherein the operations further comprise:
maintaining a balanced tree of nodes representing the groups of tracks, wherein the groups of tracks in the balanced tree are ordered according to an ordering of addresses of the tracks in the groups of tracks, wherein each group is comprised of tracks having consecutive addresses in the storage;
wherein the scanning of the tracks comprises:
traversing the balanced tree to access each of the groups according to the ordering of the balanced tree; and
in response to accessing one of the groups, processing the tracks in the group to determine whether to destage the group of tracks.

15. The system of claim 13, wherein there is a temporal indicator for each of the tracks indicating whether a track is ready to destage, wherein the operations further comprise:
increasing the density for the group of tracks in response to the temporal indicator for one of the tracks in the group of tracks transitioning from being not ready to destage to being ready to destage.

16. The system of claim 13, wherein the tracks are configured in a Redundant Array of Independent Disks (RAID) array in the storage, and wherein each of the groups of tracks comprise a stride of tracks for which parity is computed in the RAID array, wherein the strides of tracks are striped across storage devices in the storage.

17. A method for selecting tracks to destage from a cache to a storage, comprising:
scanning groups of tracks in the cache to determine whether they are ready to destage;
determining whether the tracks in a group of tracks of the groups of tracks are ready to destage in response to scanning the tracks in the group of tracks;
increasing a density for the group of tracks in response to determining that the group of tracks is not ready to destage; and
determining an urgency for destaging data based on an amount of available space in the cache, comprising one of a high urgency, medium urgency or low urgency;
destaging the groups of tracks having the density greater than a mean of densities of the groups of tracks plus a standard deviation of the mean in response to determining the urgency comprises the low urgency;
destaging the groups of tracks having the density greater than the mean in response to determining the urgency comprises the medium urgency; and
destaging the groups of tracks having the density greater than the mean minus the standard deviation in response to determining the urgency comprises the high urgency.

18. The method of claim 17, further comprising:
maintaining a balanced tree of nodes representing the groups of tracks, wherein the groups of tracks in the balanced tree are ordered according to an ordering of addresses of the tracks in the groups of tracks, wherein each group is comprised of tracks having consecutive addresses in the storage;
wherein the scanning of the tracks comprises:
traversing the balanced tree to access each of the groups according to the ordering of the balanced tree; and
in response to accessing one of the groups, processing the tracks in the group to determine whether to destage the group of tracks.

19. The method of claim 17, wherein there is a temporal indicator for each of the tracks indicating whether a track is ready to destage, further comprising:
increasing the density for the group of tracks in response to the temporal indicator for one of the tracks in the group of tracks transitioning from being not ready to destage to being ready to destage.

20. The method of claim 17, wherein the tracks are configured in a Redundant Array of Independent Disks (RAID) array in the storage, and wherein each of the groups of tracks comprise a stride of tracks for which parity is computed in the RAID array, wherein the strides of tracks are striped across storage devices in the storage.

* * * * *